United States Patent [19]
Ishido et al.

[11] Patent Number: 5,016,192
[45] Date of Patent: May 14, 1991

[54] VIDEOTEX TERMINAL WITH A MEMORY FOR STORING PLURAL PICTURE FRAMES

[75] Inventors: Takanobu Ishido; Sachiyo Tan; Masami Furukori, all of Kanagawa, Japan

[73] Assignee: Sony Corporation, Tokyo, Japan

[21] Appl. No.: 904,886

[22] Filed: Sep. 8, 1986

[30] Foreign Application Priority Data

Sep. 10, 1985 [JP] Japan .............................. 60-200078
Sep. 25, 1985 [JP] Japan .............................. 60-211725

[51] Int. Cl.⁵ .............................................. G06F 12/04
[52] U.S. Cl. ................................................... 364/518
[58] Field of Search ...................... 364/518, 521, 514; 340/723, 725, 733

[56] References Cited

U.S. PATENT DOCUMENTS

| | | | |
|---|---|---|---|
| 3,364,382 | 1/1968 | Harrison, III | 340/725 |
| 3,700,792 | 10/1972 | Harrison, III et al. | 340/725 X |
| 3,736,411 | 5/1973 | Berndt | 364/514 X |
| 3,757,037 | 9/1973 | Bialek | 340/723 X |
| 4,045,789 | 8/1977 | Bristow | 340/725 |
| 4,181,971 | 1/1980 | Frey et al. | 364/521 X |
| 4,422,105 | 12/1983 | Rodesch et al. | 364/521 X |
| 4,491,874 | 1/1985 | Yamamoto | 364/518 X |
| 4,620,289 | 10/1986 | Chauvel | 340/723 X |
| 4,641,253 | 2/1987 | Mastran | 364/518 |

OTHER PUBLICATIONS

Peterson, "Operating System Concepts", 1985, 1983, pp. 166-171.

Primary Examiner—Gary V. Harkcom
Assistant Examiner—Mark K. Zimmerman
Attorney, Agent, or Firm—Philip M. Shaw, Jr.

[57] ABSTRACT

A videotex terminal which includes a buffer memory for receiving videotex picture data, a data memory for storing units of picture data output from the buffer memory, a table memory for storing a starting address and the data size of each unit of picture data stored in the data memory in connection with a corresponding unit number of each unit, a display for displaying a picture corresponding to the picture data, and a keyboard operated memory control circuit for locating both a memory area in the data memory where new picture data can be stored and a unit number which is unused in the table memory, writing the new picture data in the located memory area of the data memory using the located unit number and changing the contents of the table memory to correspond to the contents of the data memory to indicate the newly written picture data.

8 Claims, 11 Drawing Sheets

| MULTI PAGE | |
|---|---|
| No. | COMMENT |
| 1 | 1111 |
| 2 | 2222 |
| 3 | 333 |
| 4 | |
| 5 | |
| 6 | |
| 7 | |
| 8 | |
| . | |
| . | |
| . | |
| 19 | |
| 20 | |
| DELETE: D  NO.  RET | |
| SELECT ENTRY NO. C | |

FIG. 9 (B)

| MULTI PATE | | CARROUSEL | | |
|---|---|---|---|---|
| No. | COMMENT | ORDER | ENTRY | TIMER |
| 1 | 1111 | 1 st | | |
| 2 | 2222 | 2 nd | | |
| 3 | 333 | 3 rd | | |
| 4 | | 4 th | | |
| 5 | | 5 th | | |
| 6 | | 6 th | | |
| 7 | | 7 th | | |
| 8 | | 8 th | | |
| . | | . | | |
| . | | . | | |
| . | | . | | |
| 19 | | 19 th | | |
| 20 | | 20 th | | |
| CARROUSEL  1: DEFAULT   2: RUN   3: EDIT | | | | |

FIG. 9(C)

| MULTI PAGE | | | CARROUSEL | |
|---|---|---|---|---|
| No. | COMMENT | ORDER | ENTRY | TIMER |
| 1 | 1111 | 1 st | | |
| 2 | 2222 | 2 nd | | |
| 3 | 333 | 3 rd | | |
| 4 | | 4 th | | |
| 5 | | 5 th | | |
| 6 | | 6 th | | |
| 7 | | 7 th | | |
| 8 | | 8 th | | |
| . | | . | | |
| . | | . | | |
| . | | . | | |
| 19 | | 19 th | | |
| 20 | | 20 th | | |

1: SET    2: INSERT    3: DELETE

FIG. 9(D)

| MULTI PAGE | | | CARROUSEL | |
|---|---|---|---|---|
| No. | COMMENT | ORDER | ENTRY | TIMER |
| 1 | 1111 | 1 st | | |
| 2 | 2222 | 2 nd | | |
| 3 | 333 | 3 rd | | |
| 4 | | 4 th | | |
| 5 | | 5 th | | |
| 6 | | 6 th | | |
| 7 | | 7 th | | |
| 8 | | 8 th | | |
| . | | . | | |
| . | | . | | |
| . | | . | | |
| 19 | | 19 th | | |
| 20 | | 20 th | | |

SELECT ENTRY NO.

FIG. 9 (E)

| MULTI PAGE | | | CARROUSEL | |
|---|---|---|---|---|
| No. | COMMENT | ORDER | ENTRY | TIMER |
| 1 | 1111 | 1 st | 2 | |
| 2 | 2222 | 2 nd | | |
| 3 | 333 | 3 rd | | |
| 4 | | 4 th | | |
| 5 | | 5 th | | |
| 6 | | 6 th | | |
| 7 | | 7 th | | |
| 8 | | 8 th | | |
| . | | . | | |
| . | | . | | |
| . | | . | | |
| 19 | | 19 th | | |
| 20 | | 20 th | | |

SELECT PAUSE TIMER

FIG. 9 (F)

| MULTI PAGE | | | CARROUSEL | |
|---|---|---|---|---|
| No. | COMMENT | ORDER | ENTRY | TIMER |
| 1 | 1111 | 1 st | 2 | 3 |
| 2 | 2222 | 2 nd | | |
| 3 | 333 | 3 rd | | |
| 4 | | 4 th | | |
| 5 | | 5 th | | |
| 6 | | 6 th | | |
| 7 | | 7 th | | |
| 8 | | 8 th | | |
| . | | . | | |
| . | | . | | |
| . | | . | | |
| 19 | | 19 th | | |
| 20 | | 20 th | | |

1: SET    2: INSERT    3: DELETE

FIG. 9 (G)

| MULTI PAGE | | CARROUSEL | | |
|---|---|---|---|---|
| No. | COMMENT | ORDER | ENTRY | TIMER |
| 1 | 1111 | 1 st | 2 | 3 |
| 2 | 2222 | 2 nd | 1 | 5 |
| 3 | 333 | 3 rd | | |
| 4 | | 4 th | | |
| 5 | | 5 th | | |
| 6 | | 6 th | | |
| 7 | | 7 th | | |
| 8 | | 8 th | | |
| . | | . | | |
| . | | . | | |
| . | | . | | |
| 19 | | 19 th | | |
| 20 | | 20 th | | |

1: SET  2: INSERT  3: DELETE

FIG. 9 (H)

| MULTI PAGE | | CARROUSEL | | |
|---|---|---|---|---|
| No. | COMMENT | ORDER | ENTRY | TIMER |
| 1 | 1111 | 1 st | 2 | 3 |
| 2 | 2222 | 2 nd | 1 | 5 |
| 3 | 333 | 3 rd | | |
| 4 | | 4 th | | |
| 5 | | 5 th | | |
| 6 | | 6 th | | |
| 7 | | 7 th | | |
| 8 | | 8 th | | |
| . | | . | | |
| . | | . | | |
| . | | . | | |
| 19 | | 19 th | | |
| 20 | | 20 th | | |

CARROUSEL  1: DEFAULT  2: RUN  3: EDIT

VIDEOTEX TERMINAL WITH A MEMORY FOR STORING PLURAL PICTURE FRAMES

BACKGROUND OF THE INVENTION

1. Field of the Invention

The present invention relates to a videotex terminal unit which receives data from a videotex center, stores the data in the terminal's data memory, reads out data selectively and displays it on the terminal's display screen.

2. Description of the Prior Art

Among conventional videotex terminal units, some products are capable of storing data from a videotex center into a terminal data memory, reading out data selectively and displaying it on a CRT screen. However, such conventional videotex terminal units have their data memory area and capacity fixed, and therefore either a large amount of data in excess of the capacity of the data area cannot be stored completely or otherwise many parts of the memory's data area left unused, resulting in the inefficient use of the data memory.

SUMMARY OF THE INVENTION

Accordingly, it is an object of this invention to provide a videotex terminal unit which is capable of efficiently storing data from the videotex center into the terminal's data memory.

The inventive videotex terminal unit comprises a data memory (12) for storing an arbitrary amount of data from a videotex center into an arbitrary memory area, and a table memory (13) for holding the starting address and data size of each memory area. The contents of the table memory are used to search for a vacant memory area for the new incoming data, the new data is stored in the area after erasing the old data in it when necessary, and the area starting address and data size for the new data are set in the table memory.

DESCRIPTION OF THE PREFERRED EMBODIMENT

Figure 1:
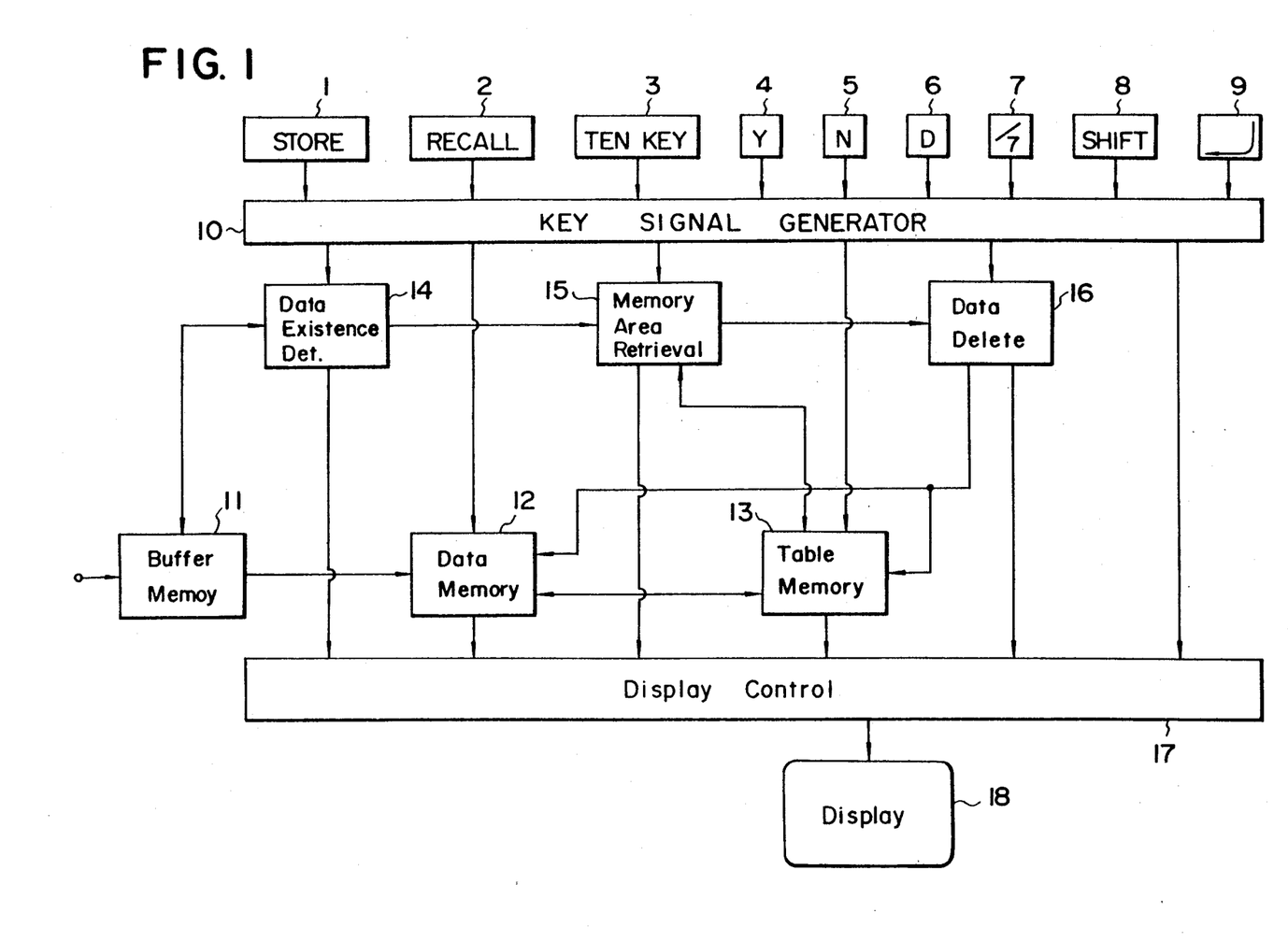
FIG. 1 is a block diagram showing an embodiment of this invention.

An embodiment of this invention will now be described in detail with reference to the drawings. In FIG. 1 showing the overall arrangement of the embodiment, the videotex terminal unit includes operating keys 1 through 9. These are a store key 1, recall key 2, ten-key set (consisting of numeral keys "0," "1," "2," ..., "9") 3, Y key 4, N key 5, D key 6, '7/' key 7, shift key 8, and return key 9. Among functional blocks, a key signal generator 10 produces key signals in response to the operation of the keys 1-9. A data memory 12 stores an arbitrary amount of data from the videotex center in arbitrary memory areas. A table memory 13 holds the area starting address and data size in correspondence to each memory area number and the comment (title) of data stored in the memory area with the memory area number. A buffer memory 11 temporarily holds data from the videotex center before it is transferred to the data memory 12. A data detector 14 detects the presence or absence of data in the buffer memory 11. A memory area retrieval unit 15 searches the table memory 13 for a vacant, memory area in the data memory 12 and determines the memory area number of the detected vacant memory area. A data eraser 16 deletes data stored in the data memory 12. A display controller 17 controls the operation of a display unit, such as a CRT unit 18.

The functional blocks 12 through 17 are controlled by the key signal generator 10, the functional blocks 11 through 16 are also controlled mutually, and the functional block 17 is also under control of the functional blocks 10 and 12 through 16. The functional block 10 through 17 are constituted of a properly programmed microprocessor and associated memory, and the memory blocks 11,12 and 13 can be constituted partially or entirely of an external semiconductor memory or a floppy disk memory. It will therefore be understood that the blocks such as "data existence detector" 14, "memory area retrieval" 15, and the like refer to functions performed by the microprocessor.

Figure 2:
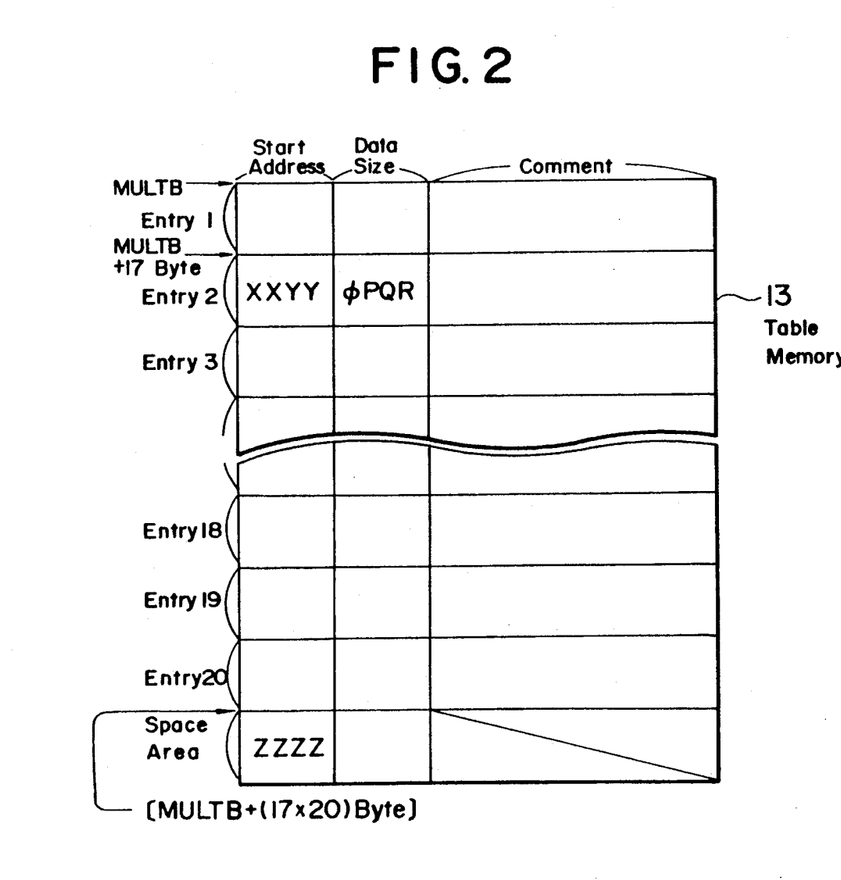
FIG. 2 is a diagram explaining the structure and contents of the table memory.
Figure 3:
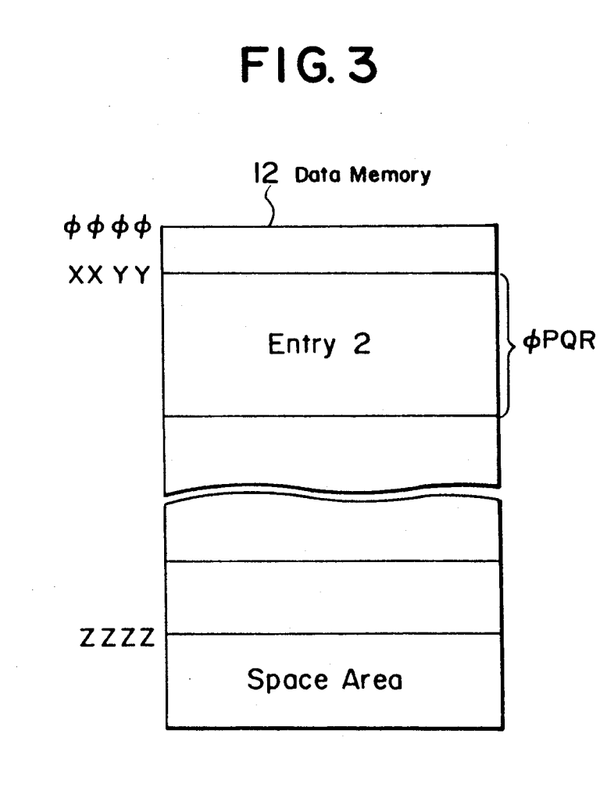
FIG. 3 is a diagram explaining the structure of the data memory.

Next, the table memory 13 and data memory 12 in FIG. 1 will be described with reference to FIGS. 2 and 3, respectively. The table memory 13 can have, for example, up to 20 memory areas, and they are numbered from 1 to 20. The table memory has a storage capacity of 32K bits. The table memory 13 stores the starting address, as an entry, of each memory area of the data memory, its data size and comment, in 2-byte, 2-byte and 13-byte lengths, respectively. In addition, the table memory 13 has 2-byte areas for storing the starting address of a vacant area and its size in the data memory 12. In the table memory 13, the starting address of entry 1 is MULTB, that of entry 2 is MULTB plus 17 bytes, and so on, and that of the vacant area is MULTB plus 17×20 bytes. The comment field for each entry can store 12 alphabetic characters as a comment (title).

The data memory 12 as the whole has a starting address expressed by 0000. For example, in FIG. 3, data is stored in the memory area of entry 2. The entry 2 has a starting address expressed by XXYY, which is held in the field of starting address for entry 2 in the table memory 13. The entry 2 in the data memory 12 has a data size of 0 PQR, which is held in the field of data size for entry 2 in the table memory 13. The data memory 12 contains further data in other entry areas, but they are not shown in the figure. The data memory 12 has a vacant area, and its starting address ZZZZ is held in the field of vacant area starting addresses in the table memory 13.

Figure 4:
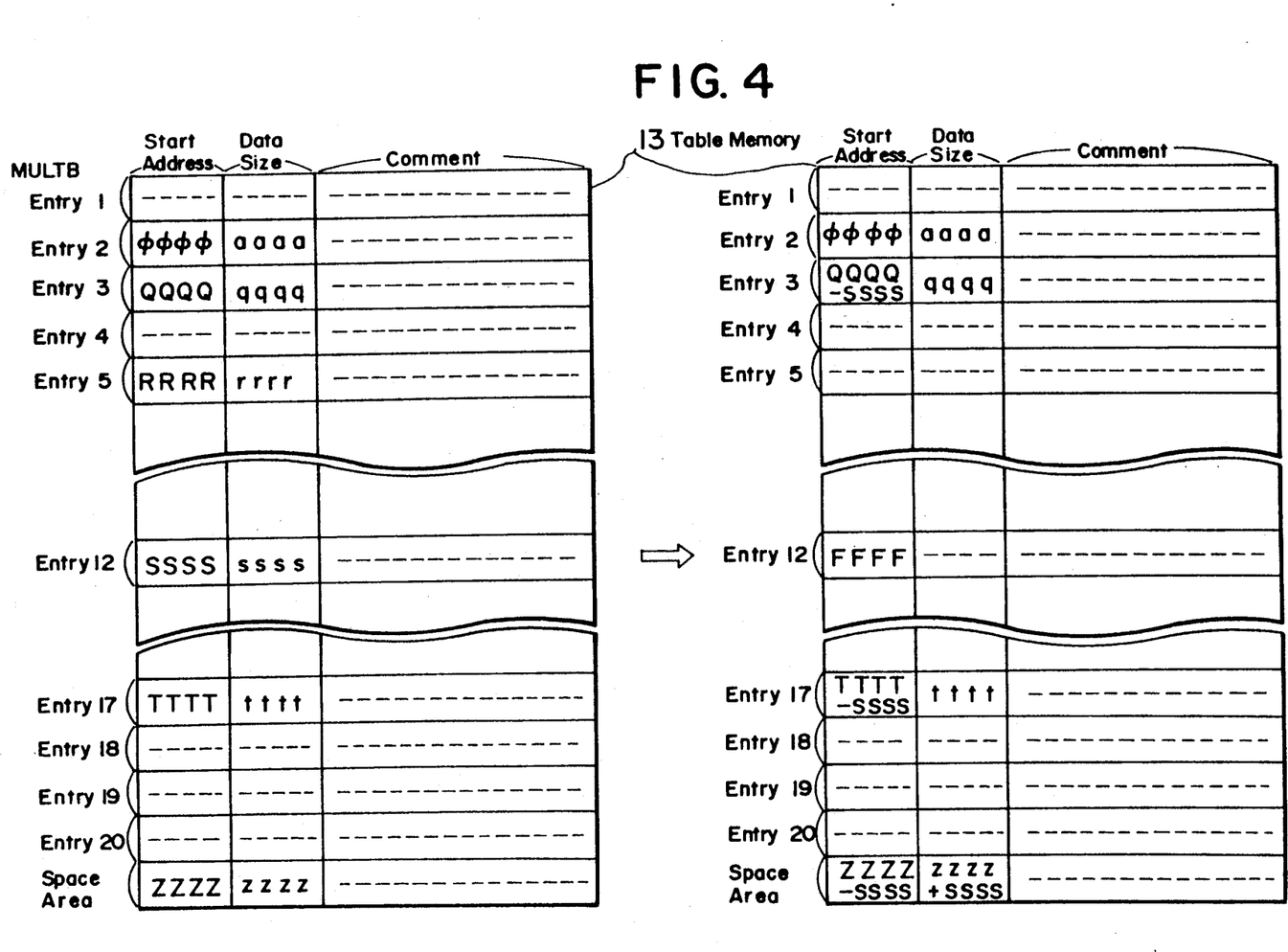
FIG. 4 is a diagram explaining a change in the contents of the table memory.
Figure 5:
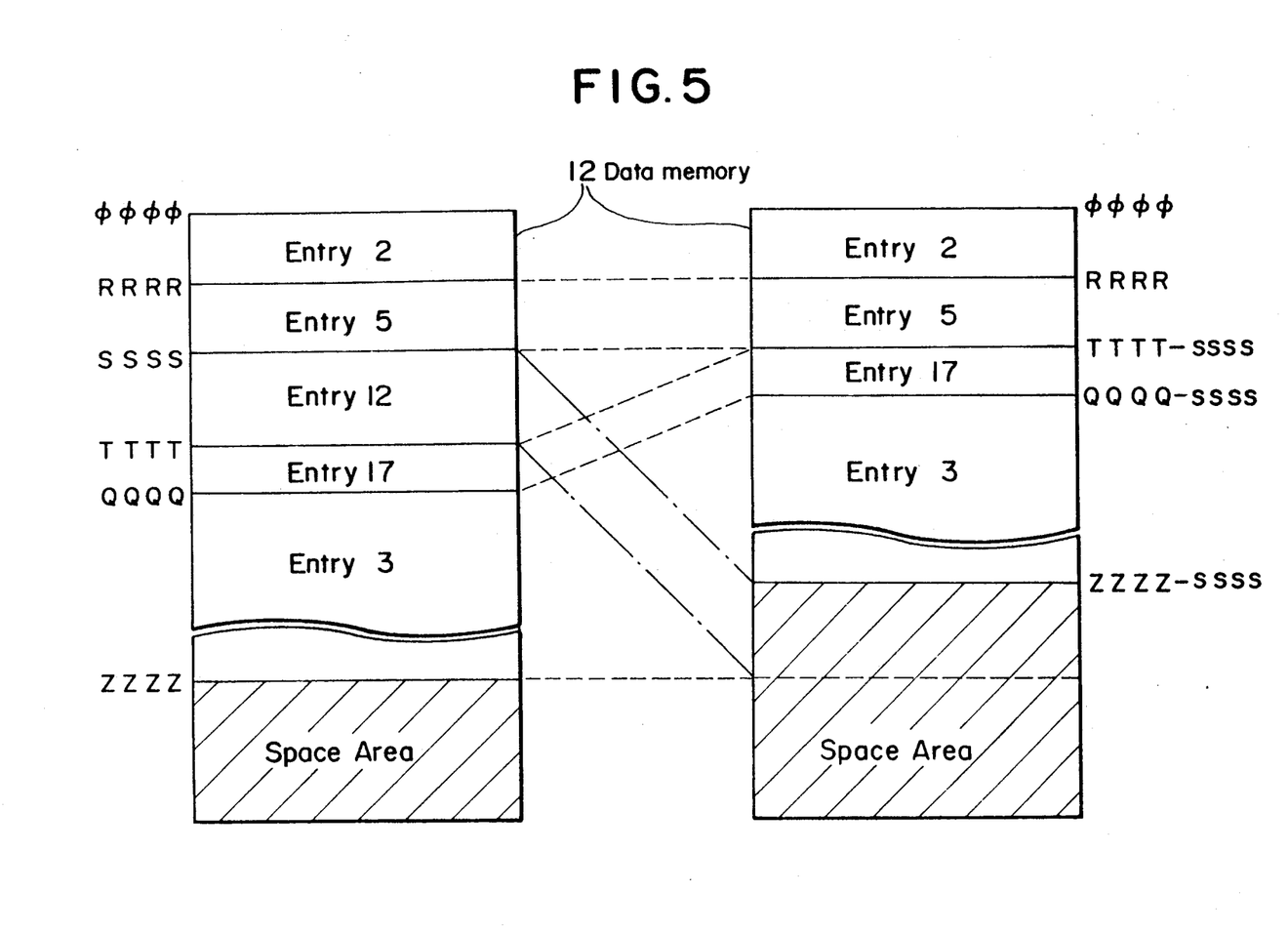
FIG. 5 is a diagram explaining a change in the contents of the data memory.

Next, the operation of deleting part of the data stored in the data memory 12 will be described with reference to FIGS. 4 and 5. FIG. 4 shows the change in the contents of the table memory 13, while FIG. 5 shows the change in the contents of the data memory 12. In FIG. 5, the data memory 12 has initially contained data in the areas of entry 2, entry 5, entry 12, entry 17 and entry 3, with their starting addresses ∅∅∅∅, RRRR, SSSS, TTTT and QQQQ being held in the respective entry starting address fields of the table memory 13, and with their data sizes aaaa, rrrr, ssss, tttt and qqqq being held in the respective data size fields of the table memory 13. The vacant area starting address ZZZZ in the data memory 12 is also held initially in the starting address field of the table memory 13.

In these states of the memories, deletion of data in entry 12, for example, in the data memory 12 will take place in the following series of steps. The right-hand section of FIG. 5 shows that the area of entry 12 in the data memory 12 is eliminated, and the vacant area has its data size increased by ssss after the change. In the data memory, after the change, entry 17 has a new starting address TTTT-ssss, entry 3 has a new starting address QQQQ-ssss and the vacant area has a new starting address ZZZZ-ssss, and these new starting addresses are stored in the respective starting address fields of the table memory 13 as shown in the right-hand section of FIG. 4. The table memory 13, after the change, has its starting address field for entry 12 holding FFFF indicative of no data stored in that area of the data memory 12, and has its vacant area data size field holding zzzz+ssss.

The table memory 13 initially stores a comment in correspondence to the entry number of the data area in the data memory 12, and once data in that area of the data memory has been deleted, the corresponding comment in the table memory 13 is also deleted.

In case new data is stored in the data memory 12, a new memory area is set up in a location immediately preceding the vacant area.

Figure 6:
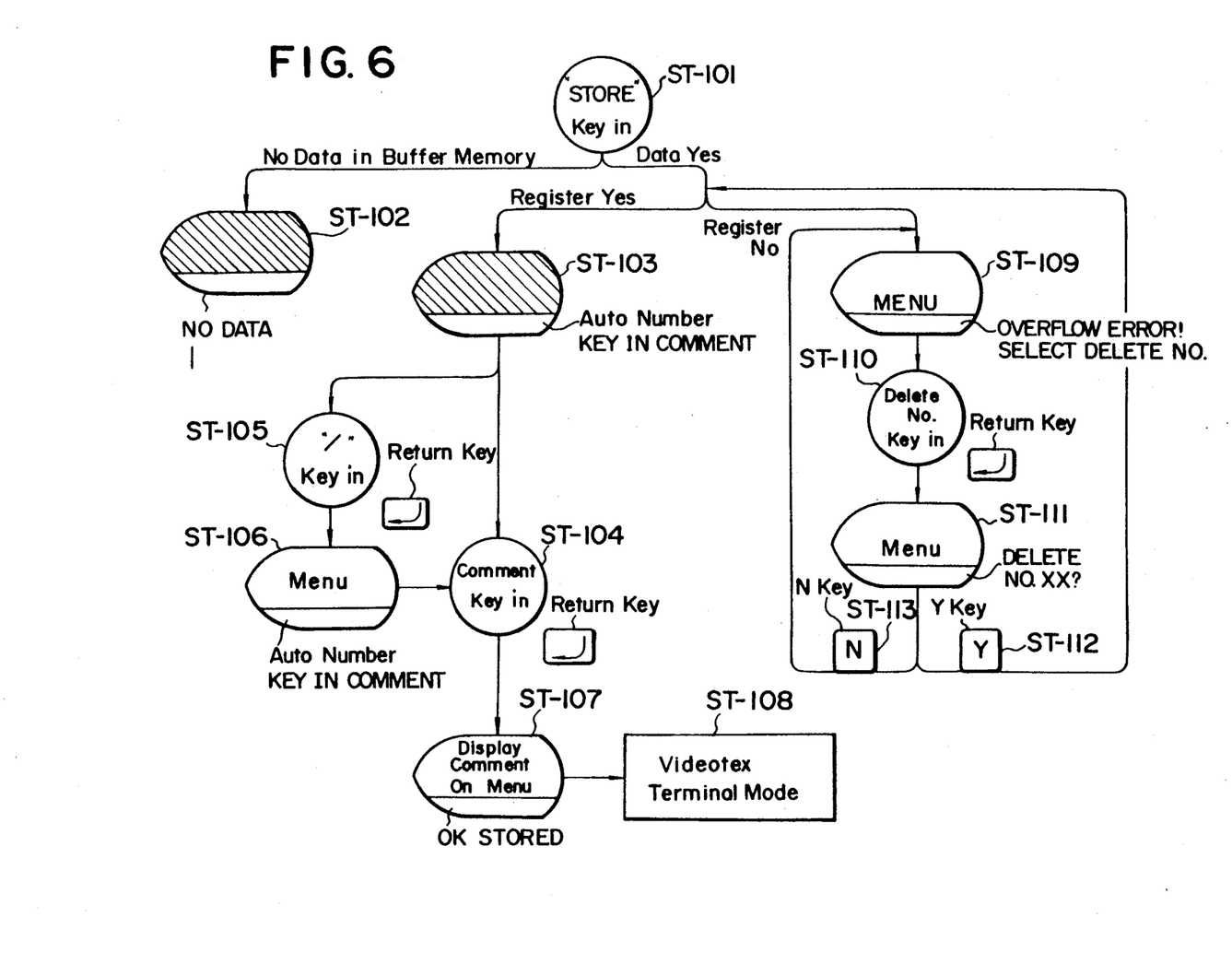
FIGS. 6 and 7 are flowcharts showing the terminal operation in a data registration mode and a data recall mode in the embodiment shown in FIG. 1.

Next, with particular reference to FIG. 6, the operation of the videotex terminal unit shown in FIG. 1 in the data storage mode will be described. Initially, the store key 1 is operated (step ST-101). In response to this key entry, the data detector 14 reads the contents of the buffer memory 11 and determines the presence of data sent from the videotex center, and, if data is absent, causes the display controller 17 to display "NO DATA" on the display unit 18 (step ST-102).

If data is found held in the buffer memory 11, the data detector 14 directs the memory area retrieval unit 15 to examine whether the table memory 13 can register (store) new data, taking into consideration the size of the data. With an affirmative examination result, the memory area retrieval unit 15 causes on the display controller 17 to display the smallest of unused entry numbers of the data memory 12, i.e., automatic numbering, and to display "KEY IN COMMENT" for prompting the comment entry on the display unit 18 (step ST-103). The operator keys-in a comment within 12 characters and then presses the return key 9 (step, ST-104). In order that the comment does not coincide with other comments, the '7/' key is pressed together with the shift key 8, and thereafter the return key 9 is pressed (step ST-105). Consequently, entry numbers 1-20 and a comment menu are displayed following the message "KEY IN COMMENT" on the display unit 18. The operator keys-in a comment for a new entry number by making reference to the menu (step ST-104). The new data is stored in the data memory 12, and its starting address data size and comment are stored in the table memory 13. The comment is displayed at the new entry number of the menu on the display unit 18, and a message "OK STORED" is displayed. (step ST-107). After that, the terminal unit again assumes the videotex terminal mode (step ST-108).

If the memory area retrieval unit 15 returns a negative result from its examination of the table memory 13 as to whether the data memory 12 can store further data in consideration of the data size, the memory area retrieval unit 15 controls the display controller 17 to display the menu and a message "OVERFLOW ERROR! SELECT DELETE NO." on the display unit 18 indicative of the disallowance of storing further data in the data memory and that an entry number of data stored in the data memory should be selected to delete old data (step ST-109). Then, the menu and the entry number selected for deletion in the form of a message "DELETE NO. xx?" are displayed on the display unit (step ST-111). The operator presses the Y key 4 upon confirmation of the entry number (step ST-112), or presses the N key 5 if the displayed entry number is incorrect (step ST-113). In response to the Y key 4, the key signal generator 10 controls the data eraser 16 so that data in the data memory 12 with that entry number is deleted, the associated comment in the table memory is deleted and other memory contents are modified, and controls the display controller 17 to remove the comment of that entry number from the screen of the display unit 18. The step ST-112 is followed by the position of the negative decision of ST-101, while the step ST-113 is followed by the top of ST-109.

Figure 7:
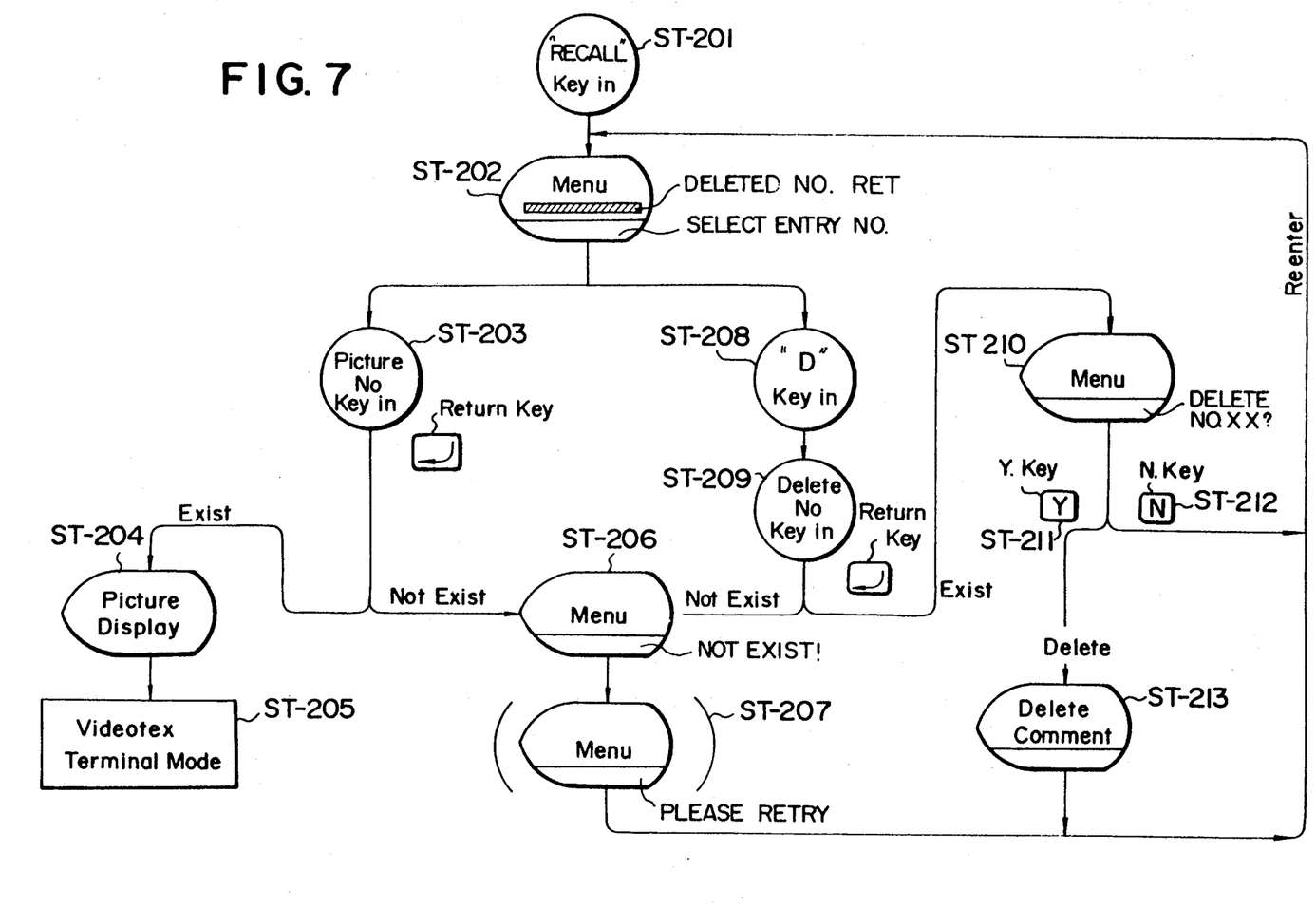

Next, the operation of the videotex terminal unit shown in FIG. 1 in data recall mode will be described with reference to FIG. 7. Initially, the recall key 2 is operated (step ST-201). In response to this key entry, the key signal generator 10 operates on the display controller 17 to display the menu and a message "DELETED NO. RET" indicative of data deletion in the data memory 12 and a message "SELECT ENTRY NO." indicative of data selection in the data memory 12 on the display unit 18 (step ST-202). In order to select data in the data memory 12 and display it on the display unit 18, the operator enters a call number using the ten-key set 3 and then presses the return key 9 (step ST-203). The memory area retrieval unit 15 looks up the table memory 13 to see whether data is stored in the memory area with the specified entry number. If data is found stored, the memory area retrieval unit 15 uses the specified entry number derived from the table memory 13 to control the data memory 12 to read out the data, and it is displayed by the display controller 17 on the display unit 18 (step, ST-204). After that, the terminal unit reverts to the videotex terminal mode (step ST-205). If, on the other hand, data is absent in the memory area designated by the specified entry number, the display controller 17 is controlled by the memory area retrieval unit 15 to display the menu and a message "NOT EXIST" indicative of the vacant memory area on the display unit 18 (step ST-206). In case the call number is a number other than 1 through 20, the display unit 18 is operated to display a message "PLEASE RETRY", prompting the entry of an other entry number (step ST-207). This step may be skipped. Thereafter, control proceeds to the end of ST-201.

In order to delete arbitrary data in the data memory 12, the D key 6 is first operated (step ST-208) and then the ten-key set 3 is used to enter the deletion entry number, and finally the return key 9 is pressed (step ST-209). The memory area retrieval unit 15 then examines the table memory 13 to see whether data is stored in the memory area with the specified entry number in the data memory 12. If data is found stored, the display unit 18 displays the menu and the entry number to be deleted in the form of a message "DELETE NO. xx?" (step ST-210). The operator presses the Y key 4 if the entry number displayed is correct (step ST-211), or the N key 5 if it is incorrect (step ST-212). In response to the Y key 4, the key signal generator 10 controls the eraser 16 to delete data with that entry number in the data memory 12, the associated comment in the table memory 13 is deleted, and other memory contents are modified, and further causes the display controller 17 to remove the comment for that entry number from the screen of the display unit 18 (step ST-213). After ST-212 or ST-213, the sequence returns to the end of ST-201.

Figure 8:
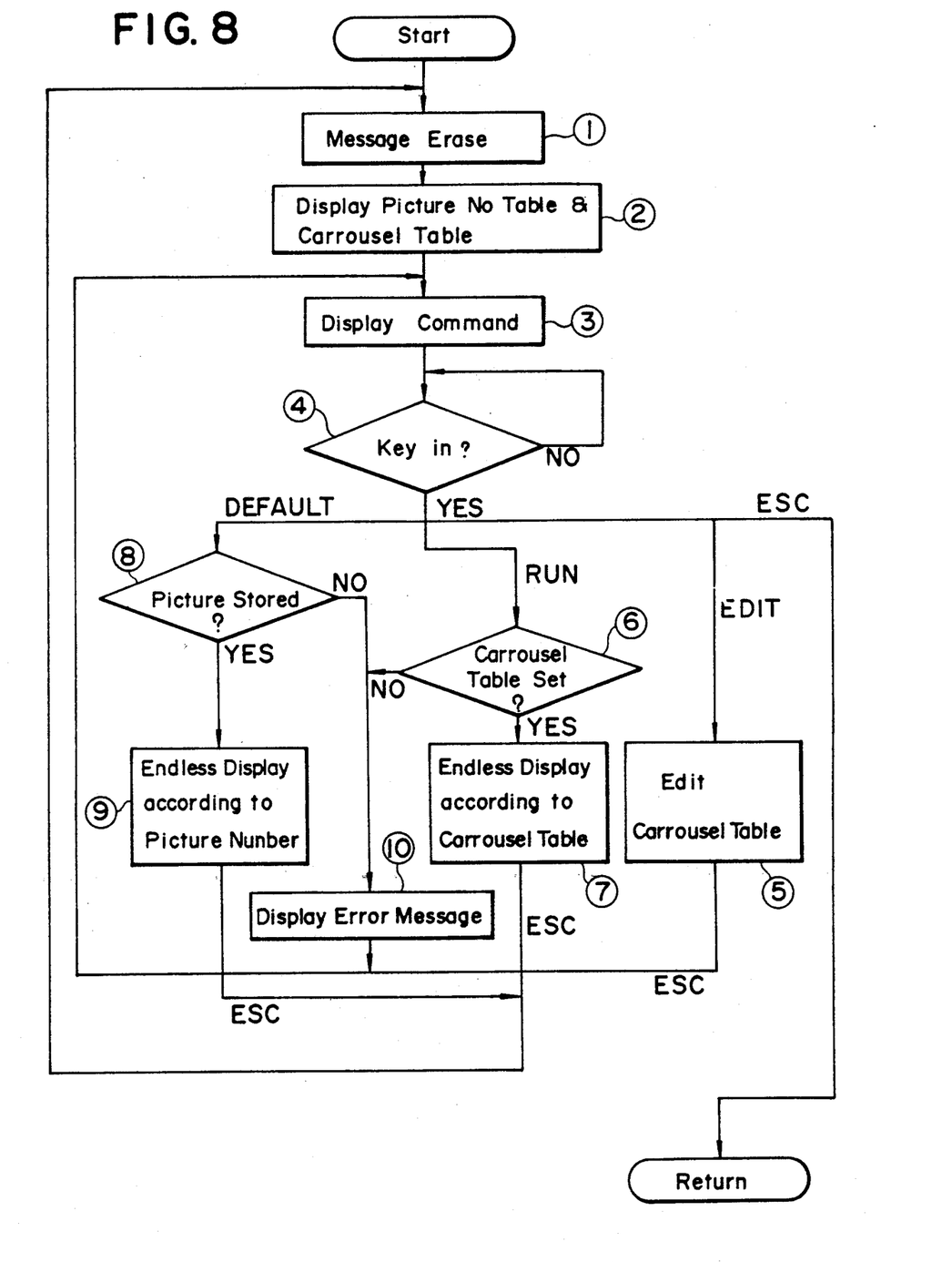
FIG. 8 is a flowchart used to explain the carrousel mode of the terminal unit.

The following describes another method of displaying data stored in the data memory 12 on the screen of the display unit 18. In this display operation called "carrousel" mode, data stored in the data memory 12 are displayed cyclically in accordance with the specified order and time length on the display unit 18. The operation of the terminal unit in carrousel mode will be described in detail by way of example with reference to the flowchart of FIG. 8 and the displays on the display unit 18 shown in FIGS. 9A-9H.

Figure 9A:
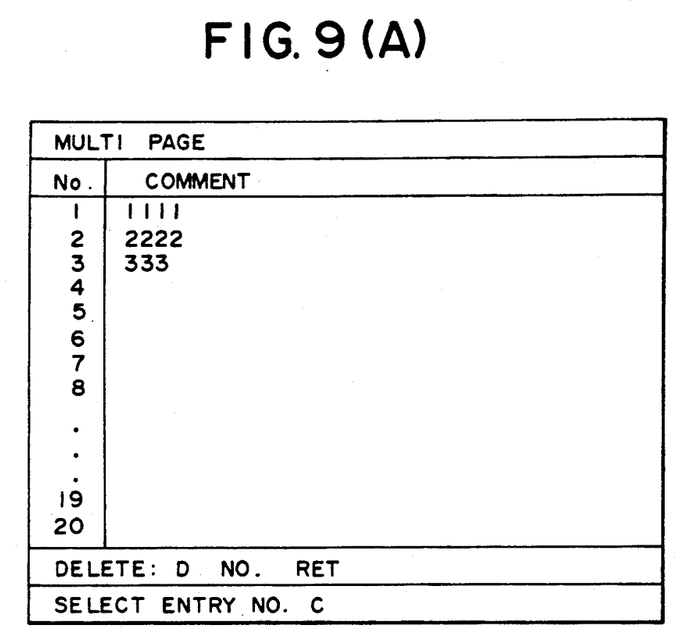
FIGS. 9A-9H are diagrams showing displays on the display screen used to explain the carrousel table.
Figure 9B:
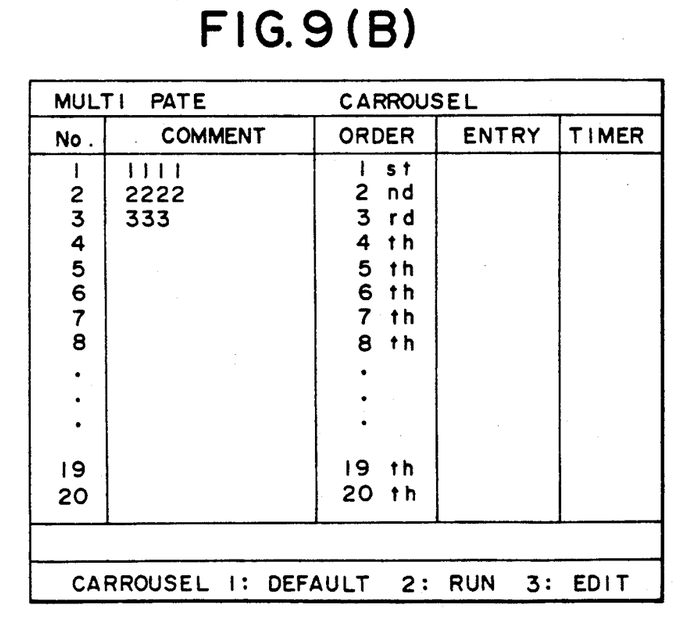

In an initial mode, a screen number table is displayed, which is followed by a message at the bottom of the screen, as shown in FIG. 9A. According to the message, when the operator presses the C key (not shown in FIG. 1), for example, and then the return key, the message at the bottom of the screen goes off (step 1), and a carrousel table appears in the right-hand section of the screen (step 2). Commands in carrousel mode are displayed in the bottom section of the screen (step 3), and the terminal unit changes to the carrousel mode as shown in FIG. 9B.

Figure 9C:
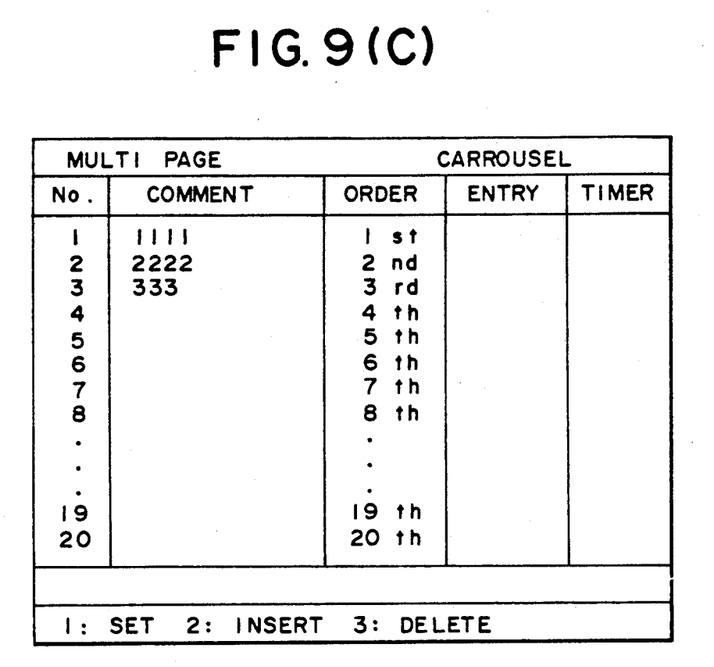

In carrousel mode, when a numeric key, e.g., "3", is pressed and then the return key to select EDIT mode (step 4), the carrousel mode commands displayed at the bottom of the screen are erased, and commands of EDIT mode for carrousel edit mode appear as shown in FIG. 9C (step 5).

Figure 9D:
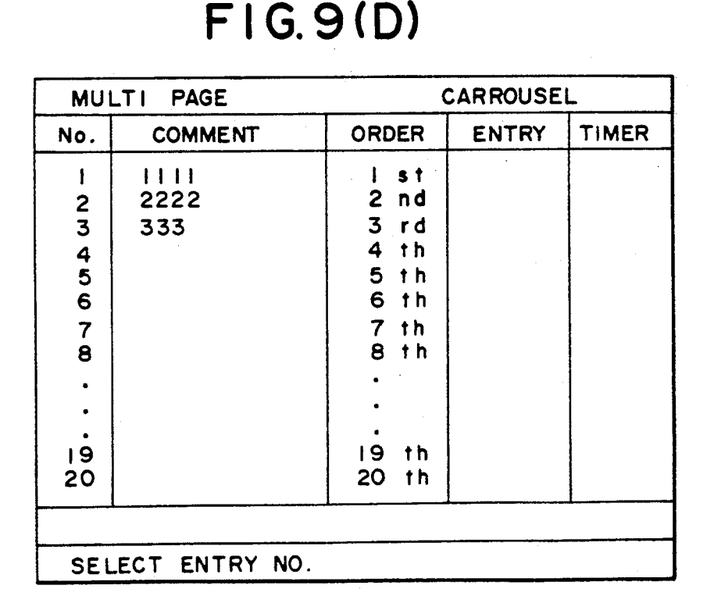

Subsequently, when a numeric key, e.g., "1", is pressed and then the return key to select SET mode, the EDIT mode commands displayed at the bottom of the screen are erased, and a message for screen number selection is displayed and a display "list" in the carrousel table blinks, as shown in FIG. 9D.

Figure 9E:
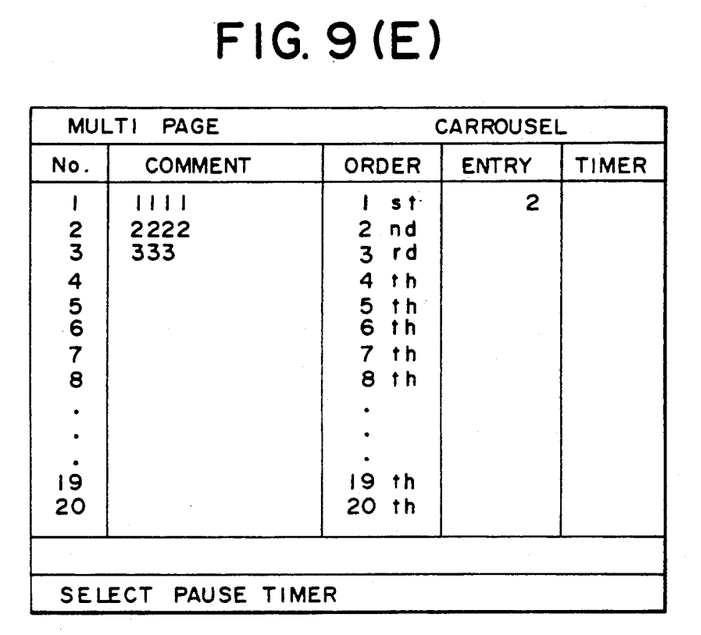
Figure 9F:
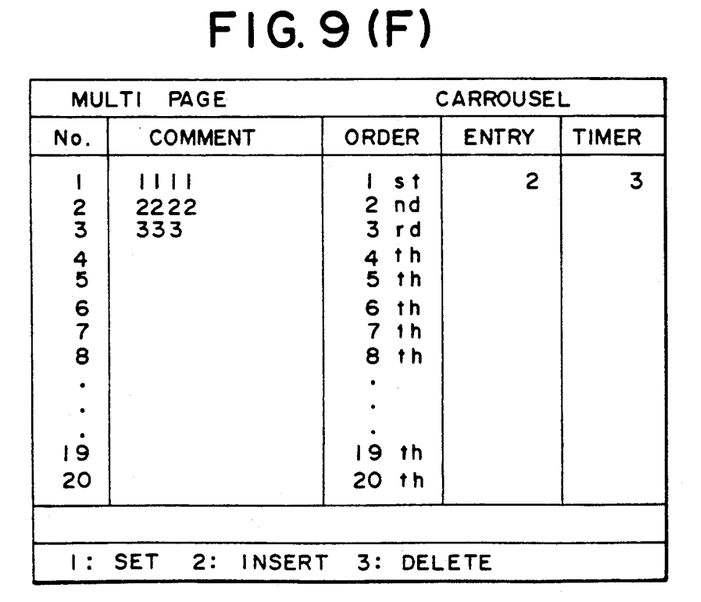
Figure 9G:
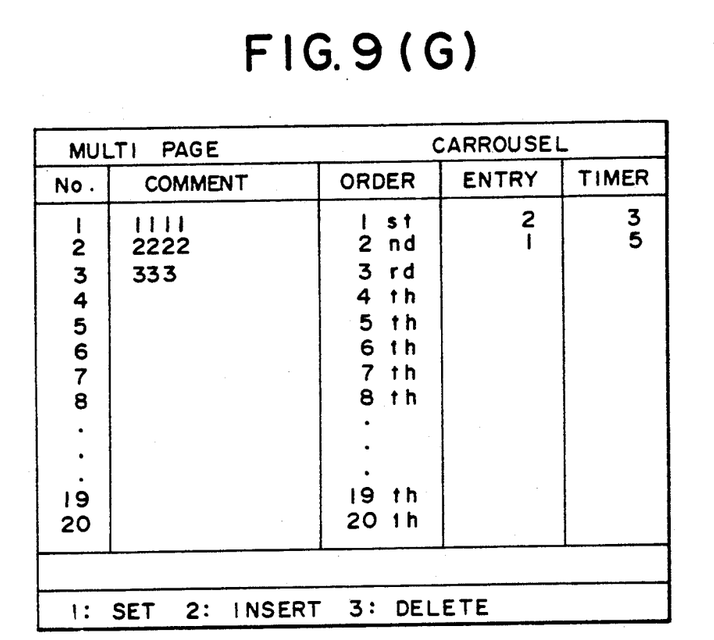

As an example of displaying screen number 2 (screen name: 2222), the "2" key and then the return key are pressed. Then, the 1st ENTRY field of the carrousel table has a display of "2", the message at the bottom of the screen is erased, and another message for display time selection is displayed, as shown in FIG. 9E. If it is intended to display the 2222 with screen number 2 for three seconds, for example, the operator presses the "3" key and then the return key. Then, the 1st TIMER field of the carrousel table has a display of "3", the message at the bottom of the screen is erased, and the EDIT mode commands are displayed here as shown in FIG. 9F. If the SET mode is selected, and if it is intended to display secondly screen number 1 (screen name: 1111) for five seconds, for example, the similar carrousel table is made with a display "1" in the 2nd ENTRY field and a display "5" in the 2nd TIMER field, and the EDIT mode commands are displayed at the bottom of the screen, as shown in FIG. 9G.

For the insertion operation, the numeric key "2" and then the return key are pressed to select INSERT mode, and for the deletion operation, the numeric key "3" and then the return key are pressed to select DELETE mode.

Figure 9H:
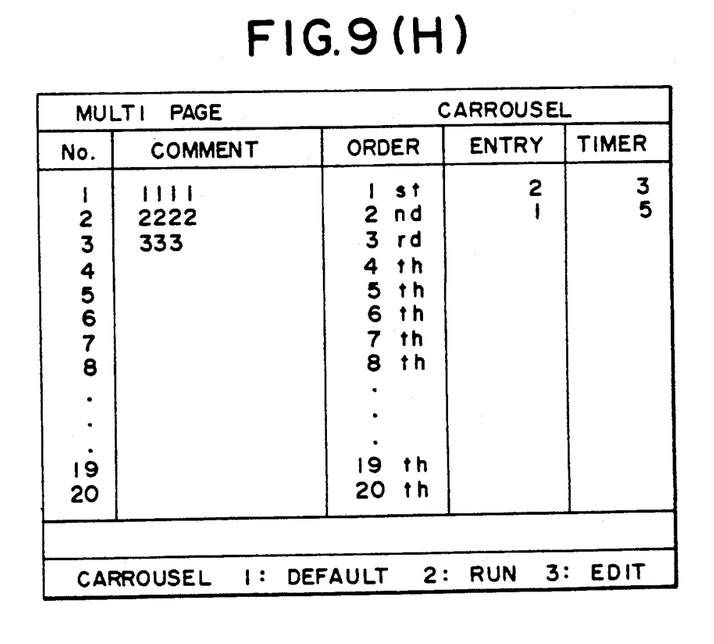

After the carrousel table has been completed, the ESC key (not shown in FIG. 1), for example, is pressed, which causes the EDIT mode commands to be erased at the bottom of the screen, and the terminal unit reverts to the carrousel mode with its commands being displayed at the bottom of the screen (step 3) as shown in FIG. 9H.

In carrousel mode, when a numeric key, e.g., "2", and then the return key are pressed to select RUN mode (step 4), it is tested by the key signal generator 10 whether the carrousel table has been made in step 6. If the carrousel table is a found made, the sequence proceeds to step 7, in which a cyclic display in accordance with the carrousel table takes place (26 in FIG. 2). For example, when the carrousel table is set up as shown in FIG. 9H, the screen (2222) with screen number 2 and the screen (1111) with screen number 1 are displayed for three seconds and five seconds, respectively, sequentially and cyclically. When the ESC key is prssed during the cyclic display operation, carrousel mode is restored by way of steps 1, 2 and 3. If, on the other hand, the carrousel table has not been made, an error message is displayed (step 10), and the carrousel mode is restored by way of step 3.

In the carrousel mode, when the numeric key "3" and then the return key are pressed to select DEFAULT mode (step 4), it is tested whether display data has been registered in step 8. If display data is found registered, the sequence proceeds to step 9, in which data are displayed cyclically in the order of the screen number. For example, when the screen number table is set up as shown in FIG. 9H, screens (1111), (2222) and (333) are displayed cyclically, in the order of the screen number at specified time intervals. When the ESC key is pressed during the cyclic display operation, the carrousel mode is restored by way of steps 1, 2 and 3. If, on the other hand, screens have not been registered, an error message is displayed (step 10) and the carrousel mode is restored by way of step 3. In the carrousel mode, when the ESC key is pressed (step 4), the terminal unit is brought back to an initial mode.

The key assignments in the above description are merely an example, and different key assignments may be made. The display table shown in FIG. 9 may be available by modifying part of the table memory 13, or alternatively it may be provided separately from the table memory 13.

The carrousel functions described in the above embodiment are summarized as follows.

a. Story editing functions (interactive system using the screen of display unit 18):

Setting of the screen number which specifies the order (n) of display and the display time length for each screen.

Insertion between n and n+1.

Deletion of a screen number and its display time length.

b. Story display functions (besides display in the order of edit):

Stop (Stopping and restarting of display at arbitrary time point).

Skip (Transition to the next screen at arbitrary time point).

Escape (Going out of the carrousel functions).

Although the present invention has been shown and described with respect to preferred embodiments, various changes and modifications which are obvious to a person skilled in the art ow which the invention pertains are deemed to lie within the spirit and scope of the invention.

What is claimed is:

1. A videotex terminal comprising, means for receiving picture data from a videotex data source, keyboard means, data memory means, connected to the picture data receiving means, for storing units of picture data fed from said videotex data source, table memory means for storing a starting address and data size of each unit of picture data in said data memory means in connection with a corresponding unit number of each unit, display means for displaying a picture corresponding to picture data supplied to the display means, and memory control means, connected to the keyboard means, for locating the address of a memory area in said data memory means where new picture data can be stored and a unit number unused in said table memory means writing said new picture data in said memory area of said data memory means with said unused unit number, and changing the contents of said table memory means so that it corresponds to the contents of said data memory means.

2. A videotex terminal according to claim 1, wherein said table memory means includes a memory area for storing a comment of each picture unit.

3. A videotex terminal according to claim 1, wherein said receiving means includes buffer memory means for storing the incoming picture data from said videotex data source and detecting means for reading out the contents of the buffer memory means and detecting the existence of the picture data in said buffer memory means and controlling said memory control means.

4. A videotex terminal according to claim 1, wherein said memory control means further includes delete means for deleting a part of the picture data in said data memory means and changing the contents of said table memory means.

5. A videotex terminal according to claim 4, wherein said delete means further changes the memory area in which the picture data is stored in the data memory means to a memory area having a starting address greater than that representing the memory area where said deleted picture data is currently stored.

6. A videotex terminal according to claim 1, wherein said memory control means includes means responsive to the operation of said keyboard means for recognizing data memory address commands entered by means of the keyboard means and reading out the picture data designated by said keyboard means from said data memory means and for supplying the same to said display means.

7. A videotex terminal comprising, means for receiving picture data from a videotex data source, keyboard means, data memory means, connected to the picture data receiving means, for storing units of picture data fed from said videotex data source, table memory means for storing a starting address and data size of each unit of picture data in said data memory means in connection with a corresponding unit number of each unit, display means for displaying a picture corresponding to picture data supplied to the display means, and memory control means, connected to the keyboard means, for locating the address of a memory area in said data memory means where new picture data can be stored and a unit number unused in said table memory means, writing said new picture data in said memory area of said data memory means with said unused unit number, and changing the contents of said table memory means so that it corresponds to the contents of said data memory means and wherein said memory control means includes carrousel means for reading out the picture data repeatedly in a preselected sequence and for supplying the picture data in said sequence to said display means.

8. A videotex terminal according to claim 7, wherein carrousel means further includes editing means connected to said keyboard means for receiving picture data sequence commands entered via the keyboard means.

* * * * *